United States Patent
Ozaki et al.

(10) Patent No.: US 9,206,875 B2
(45) Date of Patent: Dec. 8, 2015

(54) ROTARY DAMPER

(75) Inventors: Keigo Ozaki, Hamamatsu (JP); Tatsuya Kitada, Hamamatsu (JP)

(73) Assignee: KABUSHIKI KAISHA SOMIC ISHIKAWA, Tokyo (JP)

(*) Notice: Subject to any disclaimer, the term of this patent is extended or adjusted under 35 U.S.C. 154(b) by 38 days.

(21) Appl. No.: 14/110,563

(22) PCT Filed: Apr. 12, 2012

(86) PCT No.: PCT/JP2012/060003
§ 371 (c)(1),
(2), (4) Date: Nov. 5, 2013

(87) PCT Pub. No.: WO2012/141243
PCT Pub. Date: Oct. 18, 2012

(65) Prior Publication Data
US 2014/0048363 A1    Feb. 20, 2014

(30) Foreign Application Priority Data
Apr. 12, 2011 (JP) .................. 2011-087864

(51) Int. Cl.
F16D 57/02     (2006.01)
F16F 9/14      (2006.01)

(52) U.S. Cl.
CPC .................... F16F 9/145 (2013.01)

(58) Field of Classification Search
CPC ........... F16F 9/145; F16D 57/04; B60J 5/047; B60J 5/10; E05D 11/082; F16C 3/02
USPC ........... 188/296, 293; 296/50, 146.11; 16/319
See application file for complete search history.

(56) References Cited

U.S. PATENT DOCUMENTS

| 5,152,189 A * | 10/1992 | Miura et al. ................... 464/180 |
| 5,255,396 A * | 10/1993 | Miyahara et al. ............. 4/246.2 |
| 2003/0126717 A1* | 7/2003 | Iwashita ........................... 16/82 |
| 2009/0139057 A1* | 6/2009 | Honda et al. .................... 16/343 |
| 2013/0328342 A1* | 12/2013 | Okimura et al. ................ 296/66 |

FOREIGN PATENT DOCUMENTS

| EP | 1004791 A1 * | 5/2000 |
| JP | 200046087 A * | 2/2000 |
| JP | 2003206973 A * | 7/2003 |
| JP | 2006242318 A * | 9/2006 |
| JP | 200882462 A * | 4/2008 |
| JP | 201084866 A * | 4/2010 |

* cited by examiner

*Primary Examiner* — Pamela Rodriguez
(74) *Attorney, Agent, or Firm* — Cozen O'Connor

(57) ABSTRACT

The present invention provides a rotary damper comprising a hollow housing (10) which is opened at its one end and completely closed at the other end by an end wall (11), a bearing (13) formed at the end wall (11), a shaft (20) fitted to the bearing (13), a plug (30) made of metal, having an aperture (31) supporting the shaft (20) and closing an opening in the housing (10), partitions (40) arranged inside the housing (10) for rotation in accordance with rotation of the housing (10), viscous liquid filling chambers (71 and 72) defined by the partitions (40), and metal vanes (51 and 52) arranged in the chambers (71 and 72) for rotation in accordance with the rotation of the shaft (20), wherein the vane (51 and 52) includes a check valve, the check valve includes a valve body (84), and the valve body (84) includes a stop 84c made of resin and arranged between the plug (30) and the vanes (51 and 52).

3 Claims, 9 Drawing Sheets

ROTARY DAMPER

TECHNICAL FIELD

The present invention relates to a rotary damper.

BACKGROUND ART

Conventionally, a rotary damper has been known that comprises a hollow housing which is opened at its one end and completely closed at the other by an end wall, a bearing formed in the end wall, a shaft fitted to the bearing, a plug having an aperture supporting the shaft and closing an opening in the housing, a partition arranged inside the housing for rotation in accordance with rotation of the housing, viscous liquid filling chambers defined by the partition, and a vane arranged in the chamber for rotation in accordance with the rotation of the shaft (see, e.g., JP 2008-082462 A).

In this kind of the rotary damper, the end wall completely closes the other end of the housing. Therefore, when the housing or the shaft rotates, the viscous liquid flows into a space between the bearing and the shaft to float the shaft. Consequently, the vane slides in the state where it is pushed against the plug. When both the plug and the vane are made of metal, abrasions occur on both the plug and the vane, resulting in a problem of deteriorating characteristics.

CITATION LIST

Patent Literature

Patent Literature 1: JP 2008-082462 A

SUMMARY OF INVENTION

Technical Problem

An object to be achieved by the invention is to improve durability by preventing abrasions of a plug and a vane.

Solution to Problem

In order to solve the problem, the invention provides a rotary damper described below.
1. A rotary damper comprising:
   a hollow housing which is opened at its one end and completely closed by an end wall at the other end;
   a bearing formed in the end wall;
   a shaft fitted to the bearing;
   a plug made of metal, having an aperture into which the shaft is inserted, and fixed to the housing for closing the opening of the housing;
   a partition arranged inside the housing for rotation in accordance with rotation of the housing;
   a viscous liquid filling a chamber defined by the partition; and
   a vane made of metal and arranged in the chamber for rotation in accordance with the rotation of the shaft,
   wherein the vane includes a check valve, the check valve includes a valve body, and the valve body includes a stop made of resin and arranged between the plug and the vane, and the stop interposed between the plug and the vane is configured to prevent flotation of the shaft to reduce the abrasions of the plug and the vane.

Advantageous Effects of Invention

In a rotary damper of the invention, both a plug and a vane are made of metal. However, the vane has a check valve, the check valve has a valve body, and the valve body has a stop made of resin and arranged between the valve body and the plug. When the housing or the shaft rotates, the stop is interposed between the plug and the vane to avoid direct contact of the plug with the vane. Therefore, the rotary damper of the invention can prevent the abrasions of the plug and the vane to improve the durability.

DESCRIPTION OF EMBODIMENTS

Embodiments of the invention will be described below with reference to the drawings, but the invention is not restricted to the following embodiments.

First Embodiment

FIGS. 1 to 4 illustrate a rotary damper according to a first embodiment of the invention. As illustrated in these figures, the rotary damper according to the first embodiment includes a housing 10, a shaft 20, a plug 30, partitions 40, a viscous liquid and vanes.

Figure 1:
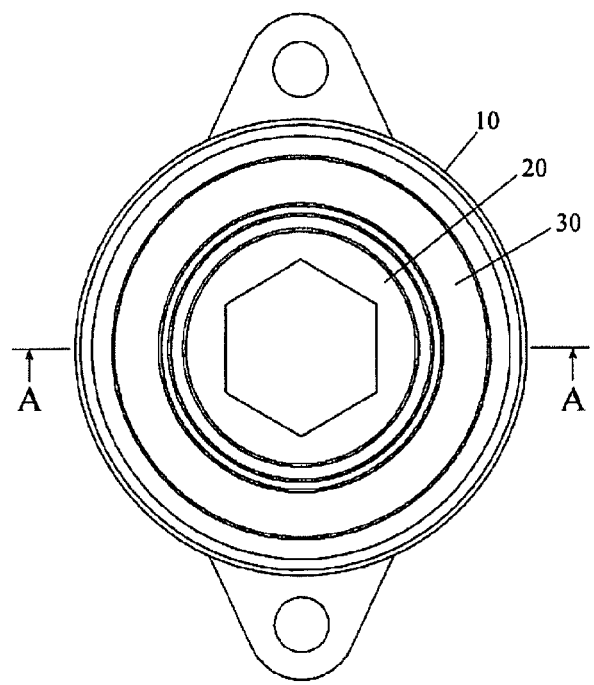
FIG. 1 is a plan view of a rotary damper according to a first embodiment of the invention.
Figure 2:
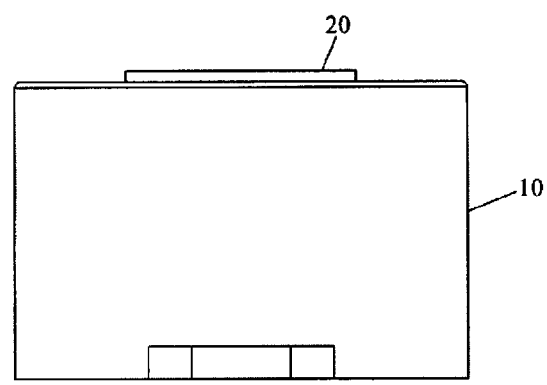
FIG. 2 is an elevation view of the rotary damper according to the first embodiment of the invention.
Figure 3:
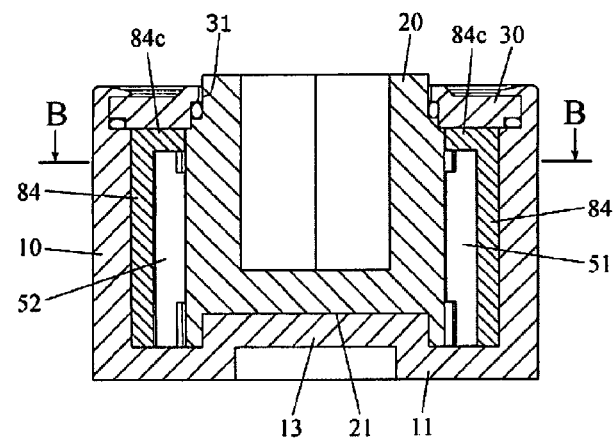
FIG. 3 is a cross-sectional view taken along line A-A in FIG. 1.

The housing 10 is open at its one end, and is completely closed at the other end by an end wall 11 (see FIG. 3). The housing 10 has a cylindrical peripheral wall 12 integral with the end wall 11, and is hollow (see FIGS. 3 and 4). The end wall 11 has a bearing 13 (see FIG. 3). The end wall 11 completely closes the other end of the housing 10, and therefore an aperture extending through the end wall 11 cannot be employed as a bearing formed in the end wall 11. The bearing 13 in the first embodiment has a convex form, but may have a concave form.

The shaft 20 has a concavity fitted to the bearing 13 (see FIG. 3). When the bearing formed in the end wall 11 has a concave form, a shaft having a convexity fitted to the bearing is employed. The plug 30 closes the opening at one end of the housing 10, and is attached to the housing 10 by caulking the end of the peripheral wall 12 of the housing 10 (see FIG. 3). The plug 30 has an aperture 31 supporting the shaft 20 (see FIG. 3). The shaft 20 has one end fitted to and supported by the bearing 13 and the other end inserted into and supported by the aperture 31.

Figure 4:
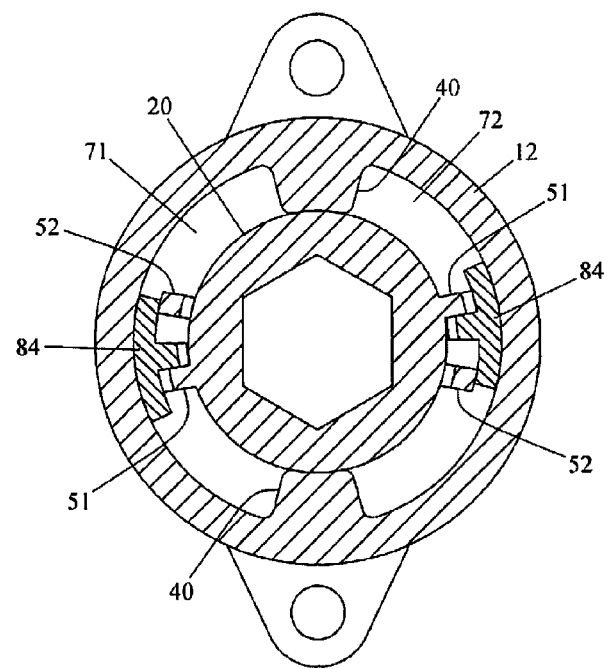
FIG. 4 is a cross-sectional view taken along line B-B in FIG. 3.

Inside the housing 10, the partitions 40 are arranged for rotation in accordance with the rotation of the housing 10 (see FIG. 4). The viscous liquid fills chambers 71 and 72 defined by the partitions 40 (see FIG. 4). The vanes are arranged for rotation inside the chambers 71 and 72 defined by the partitions 40 in accordance with the rotation of the shaft 20 (see FIG. 4). The vanes employed in the first embodiment include a first pressurizing portion 51 and a second pressurizing portion 52. When the housing 10 rotates around the shaft 20, the partition 40 functions as a device for pressurizing the viscous liquid. When the shaft 20 rotates inside the housing 10, the vanes (the first and second pressurizing portions 51 and 52) function as devices for pressurizing the viscous liquid.

The vanes (the first and second pressurizing portions 51 and 52) have check valves. The check valve has a valve body 84. The check valve is configured to flow the viscous liquid only in one direction by a combination of first, second and third grooves 81, 82 and 83 formed in the first and second pressurizing portions 51 and 52, and the valve body 84, respectively.

More specifically, the first and second pressurizing portions 51 and 52 are spaced by a certain distance from each other. A first groove 81 is formed in a position remote from the shaft 20, and a second groove 82 is formed in a position near the shaft 20 (see FIGS. 5 and 6). The valve body 84 includes a main body 84a which has a width always allowing contact with tip end surfaces of the first and second pressurizing portions 51 and 52. The main body 84a is arranged between the peripheral wall 12 of the housing 10 and the first and second pressurizing portions 51 and 52. The valve body 84 also includes a projection 84b which projects from the main body 84a. The projection 84b is arranged between the first and second pressurizing portions 51 and 52. The projection 84b has a third groove 83 which continues to the second groove 82 when the projection 84b is in contact with the second pressurizing portion 52 (see FIGS. 6 and 7). The third groove 83 is formed in a position where it does not continue to the first groove 81 when the projection 84b is in contact with the first pressurizing portion 51 (see FIG. 5).

Figure 5:
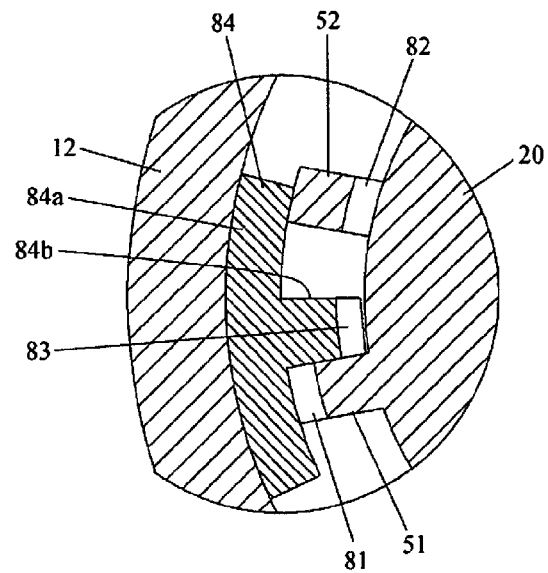
FIG. 5 illustrates a structure and an operation of a check valve employed in the first embodiment of the invention.
Figure 6:
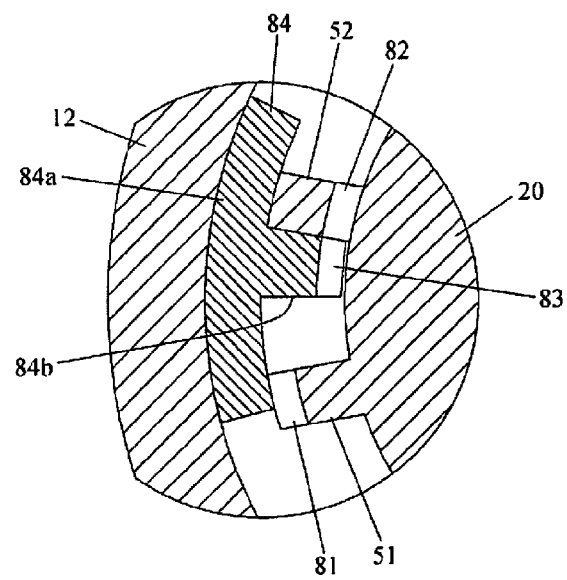
FIG. 6 illustrates the structure and the operation of the check valve employed in the first embodiment of the invention.

In the check valve configured as described above, when the shaft 20 rotates clockwise in FIG. 5, that is, when the check valve is closed, the second pressurizing portion 52 pressurizes the viscous liquid, and thereby the main body 84a of the valve body 84 receives the resistance of the viscous liquid so that the projection 84b of the valve body 84 comes into contact with the first pressurizing portion 51 (see FIG. 5). The viscous liquid flows through the second groove 82 into the third groove 83, and is dammed up by the first pressurizing portion 51 (see FIG. 5). Consequently, a braking force reducing a rotation speed of the shaft 20 occurs. Conversely, when the shaft 20 rotates counterclockwise in FIG. 6, that is, when the check valve opens, the first pressurizing portion 51 pressurizes the viscous liquid, and thereby the main body 84a of the valve body 84 receives the resistance of the viscous liquid so that the projection 84b of the valve body 84 comes into contact with the second pressurizing portion 52 (see FIG. 6). The viscous liquid is not dammed by the second pressurizing portion 52, and flows through the first and third grooves 81 and 83 into the second groove 82 (see FIG. 6). Consequently, the braking force reducing the rotation speed of the shaft 20 does not occur.

Figure 7:
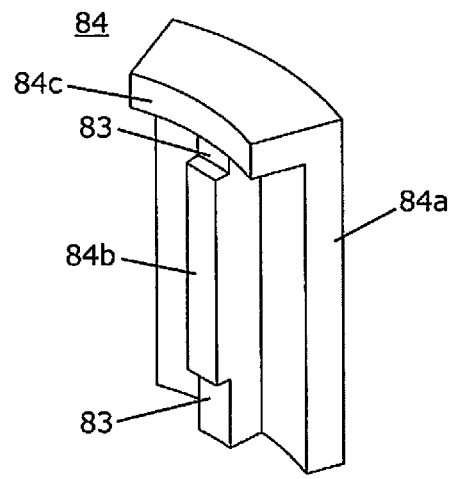
FIG. 7 is a perspective view of a valve body employed in the first embodiment of the invention.
Figure 8:
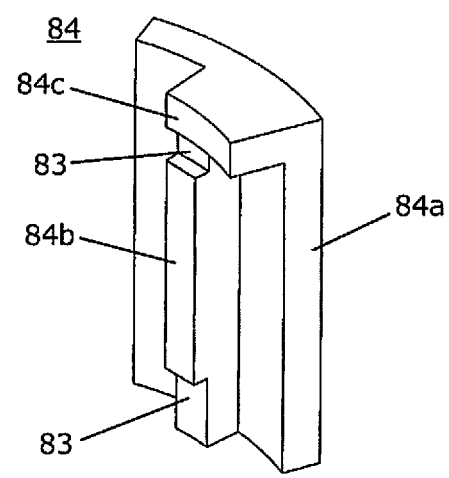
FIG. 8 is a perspective view of a valve body employed in a second embodiment of the invention.

The valve body 84 further includes a stop 84c made of resin and arranged between the plug 30 and the vanes (the first and second pressurizing portions 51 and 52) (see FIGS. 3 and 7).

According to the rotary damper thus configured, even when the plug 30 and the vanes (the first and second pressurizing portions 51 and 52) are made of metal, the stop 84c which is made of the resin and is interposed between the plug 30 and the vanes (the first and second pressurizing portions 51 and 52) can prevent direct contact between the plug 30 and the vanes (the first and second pressurizing portions 51 and 52), and therefore can reduce the abrasions of the plug 30 and the vanes (the first and second pressurizing portions 51 and 52).

Second Embodiment

A rotary damper according to the second embodiment differs from the rotary damper according to the first embodiment in structures of vanes and a valve body 84. More specifically, the vane of the second embodiment includes first and second pressurizing portions 51 and 52 similarly to the vanes of the first embodiment, but the first pressurizing portion 51 is axially longer than the second pressurizing portion 52 (see FIGS. 9 and 10). However, the axial length of the first pressurizing portion 51 is determined such that the first pressurizing portion 51 may not come into contact with a plug 30 during rotation of a housing 10 or a shaft 20.

Figure 9:
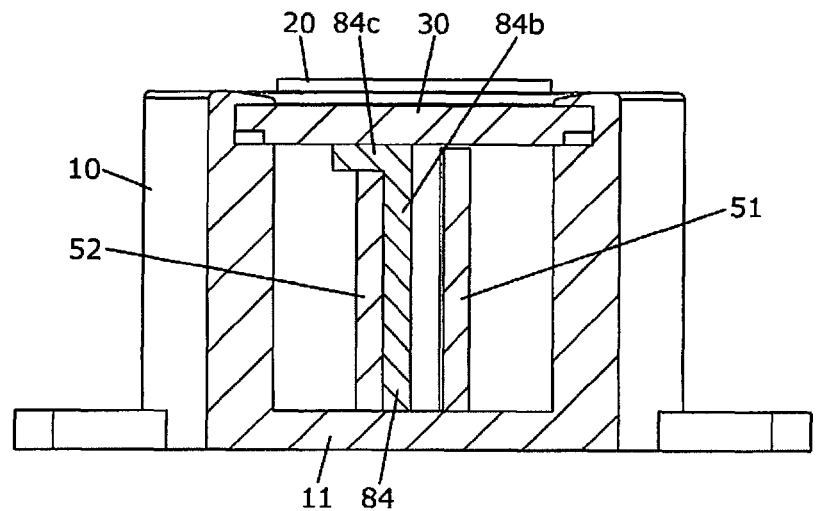
FIG. 9 illustrates an operation of the valve body employed in the second embodiment of the invention.
Figure 10:
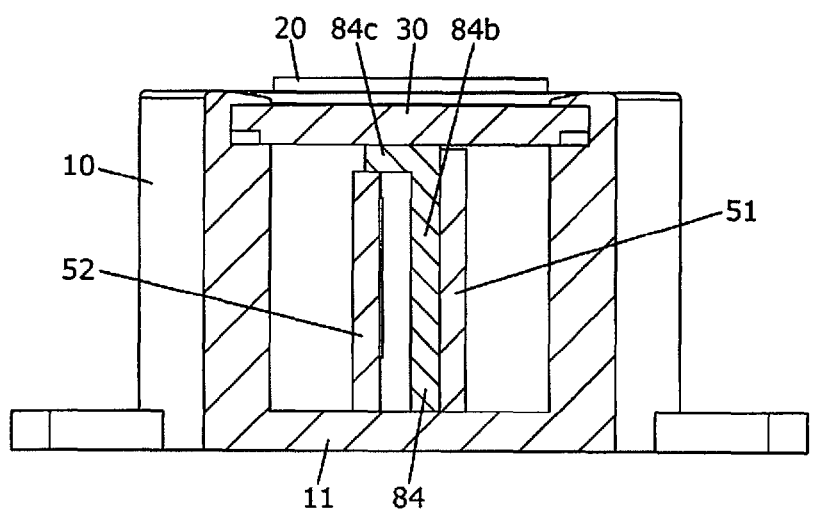
FIG. 10 illustrates the operation of the valve body employed in the second embodiment of the invention.

Similarly to the valve body 84 of the first embodiment, the valve body 84 includes a stop 84c arranged between the plug 30 and the second pressurizing portion 52, but does not have a portion arranged between the plug 30 and the first pressurizing portion 51 (see FIGS. 9 and 10). FIG. 9 illustrates an arrangement of the valve body 84 in an open state of a check valve, and FIG. 10 illustrates an arrangement of the valve body 84 in a closed state of the check valve.

In a rotary damper according to the first embodiment, when the valve body 84 moves in the closed state of the check valve, a difference occurs between the pressure of the viscous liquid applied to the stop 84c and the pressure of the viscous liquid applied to a projection 84b. Therefore, an excessive load is applied to a boundary between the stop 84c and the projection 84b, and consequently the valve body 84 may break.

However, in the rotary damper according to the second embodiment, as illustrated in FIG. 10, when the check valve is closed, the stop 84c is arranged between the plug 30 and the second pressurizing portion 52, and comes into contact with the first pressurizing portion 51 so that it is supported by the first pressurizing portion 51. Therefore, a load applied to a boundary portion between the stop 84c and the projection 84b decreases, and the breakage of the valve body 84 can be prevented.

In the rotary damper thus configured, the stop 84c made of resin interposed between the plug 30 and the vane (the second pressurizing portion 52) can likewise prevent the direct contact between the plug 30 and the vanes (the first and second pressurizing portions 51 and 52), and therefore can reduce the abrasions of the plug 30 and the vanes (the first and second pressurizing portions 51 and 52).

Third Embodiment

Figure 11:
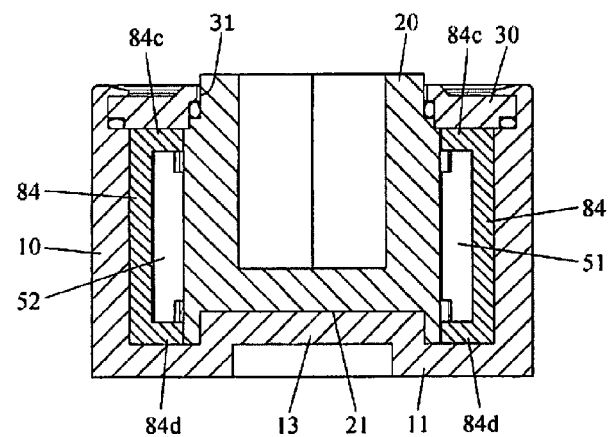
FIG. 11 is a cross-sectional view of a rotary damper according to a third embodiment of the invention.
Figure 12:
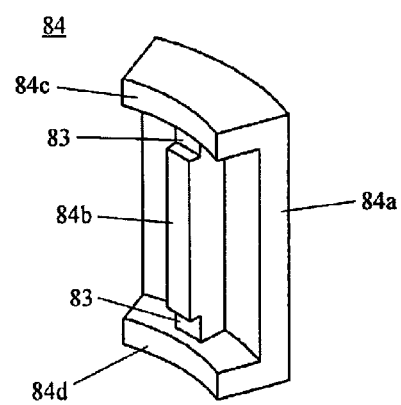
FIG. 12 is a perspective view of a valve body employed in the third embodiment of the invention.

A rotary damper according to the third embodiment differs in a structure of a valve body 84 from the rotary damper according to the first embodiment. The valve body 84 of the third embodiment further includes a stop 84*d* made of resin and arranged between an end wall 11 and vanes (first and second pressurizing portions 51 and 52) (see FIGS. 11 and 12).

An experiment was performed using the rotary damper according to the third embodiment and a rotary damper according to a comparative example. The rotary damper according to the comparative example does not have stops 84*c* and 84*d*, and is different in this structure from the rotary damper of the third embodiment.

In this experiment, a shaft was rotated by 60 degrees from an initial position in a braking force generating direction, and this rotation was repeated 30,000 times with a housing kept in a fixed state. A load applied to the shaft was 14 Nm, and plugs and vanes in both the third embodiment and the comparative example were made of metal.

After the experiment, thicknesses of the plugs were measured. An abrasion of 0.026 mm was determined in the comparative example, and an abrasion of only 0.0035 mm was determined in the third embodiment. Before and after the experiment, a time required for rotation of the shaft by 60 degrees from an initial position in a braking force generating direction was measured. In the comparative example, times before and after the experiment were 1.9 seconds and 0.8 second, respectively, and remarkable lowering of the braking characteristics was determined. In the third embodiment, the times before and after the experiment were 1.9 seconds and 1.5 seconds, respectively, and it was determined that the lowering of the braking characteristics was suppressed. Therefore, the rotary damper according to the third embodiment can improve the durability.

Further, in the rotary damper according to the third embodiment, even when the shaft 20 receives an unbalanced load and rotates eccentrically, abrasions of the end wall 11 and the vanes (the first and second pressurizing portions 51 and 52) can be small because the stop 84*d* made of the resin is interposed between the end wall 11 of a housing 10 and the vanes (the first and second pressurizing portions 51 and 52) in addition to a stop 84*c*. Therefore, the durability can be further increased.

Fourth Embodiment

Figure 13:
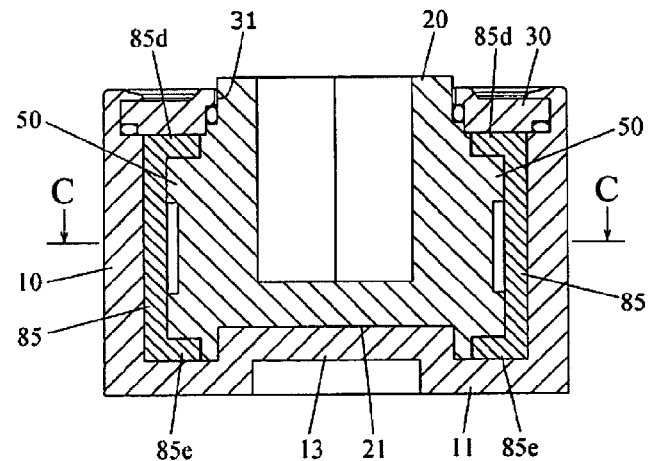
FIG. 13 is a cross-sectional view of a rotary damper according to a fourth embodiment of the invention.
Figure 14:
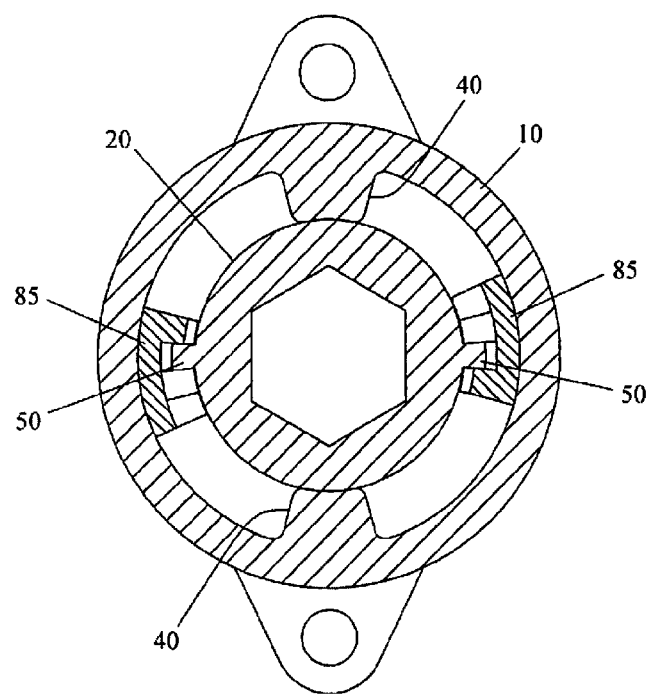
FIG. 14 is a cross-sectional view taken along line C-C in FIG. 13.

FIGS. 13 and 14 are cross-sectional views of a rotary damper according to a fourth embodiment of the invention. As illustrated in these figures, the rotary damper according to the fourth embodiment differs from the rotary damper according to the first embodiment in structures of the vane and the check valve.

The check valve employed in the fourth embodiment is configured to flow a viscous liquid only in one direction by a combination of a first groove 86 formed in a vane 50 and second and third grooves 87 and 88 formed in a valve body 85.

Figure 15:
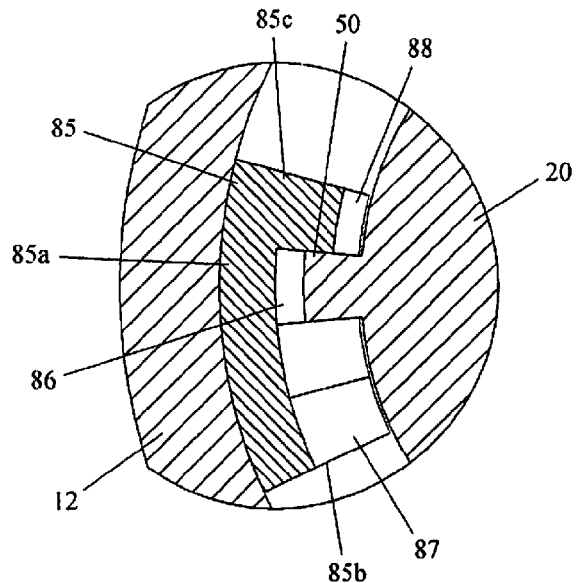
FIG. 15 illustrates a structure and an operation of a check valve employed in the fourth embodiment of the invention.
Figure 16:
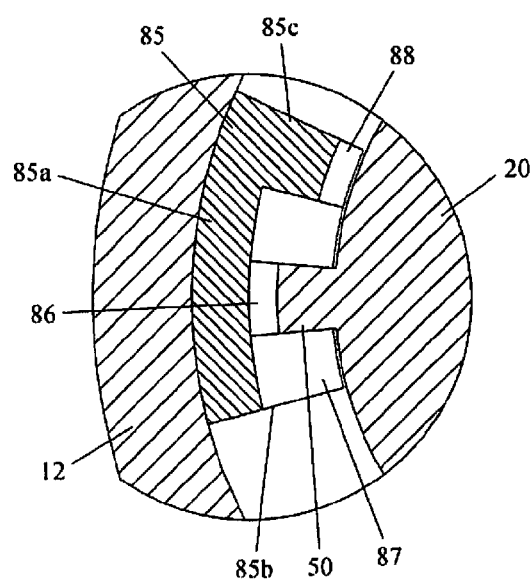
FIG. 16 illustrates the structure and the operation of the check valve employed in the fourth embodiment of the invention.
Figure 17:
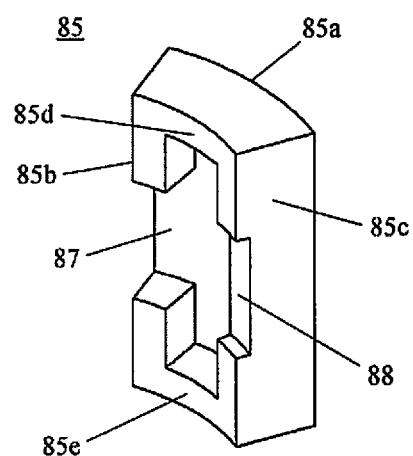
FIG. 17 is a perspective view of a valve body employed in the fourth embodiment of the invention.

More specifically, the vane 50 has the first groove 86 at its tip end (see FIGS. 15 and 16). The valve body 85 is formed of a main body 85*a* having a predetermined width and arranged between the vane 50 and a peripheral wall 12 of a housing 10, a first projection wall 85*b* having the second groove 87 and projecting from the main body 85*a*, a second projection wall 85*c* having a third groove 88 and projecting from the main body 85*a* with a constant space kept with respect to the first projection wall 85*b*, a stop 85*d* made of resin and arranged between a plug 30 and the vane 50, and a stop 85*e* made of resin and arranged between an end wall 11 of the housing 10 and the vane 50 (see FIGS. 15 to 17). The vane 50 is arranged between the first and second projection walls 85*b* and 85*c*.

When the vane 50 comes into contact with the second projection wall 85*c*, the first and third grooves 86 and 88 are not connected together, and the second projection wall 85*c* closes the first groove 86 (see FIG. 15). When the vane 50 comes into contact with the first projection wall 85*b*, the first and second grooves 86 and 87 are connected together (see FIG. 16).

In the check valve thus configured, when a shaft 20 rotates clockwise in FIG. 15, the second projection wall 85*c* of the valve body 85 comes into contact with the vane 50 (see FIG. 15). In this state, the viscous liquid flows into the third groove 88, and is dammed up by the vane 50 (see FIG. 15). This generates a braking force to decrease a rotation speed of the shaft 20. When the shaft 20 rotates counterclockwise in FIG. 16, the first projection wall 85*b* of the valve body 85 comes into contact with the vane 50 (see FIG. 16). In this state, the viscous liquid is not dammed up by the vane 50, and flows through the second and first grooves 87 and 86 into the third groove 88. Consequently, a braking force decreasing the rotation speed of the shaft 20 does not occur.

In the rotary damper configured as described above, even when the plug 30 and the vane 50 are made of the metal, the stop 85*d* made of the resin can prevent direct contact between the plug 30 and the vane 50, and therefore can reduce the abrasions of the plug 30 and the vane 50.

Even when the shaft 20 receives an unbalanced load, and rotates eccentrically, the abrasion of the end wall 11 and the vane 50 can be reduced owing to the stop 85*d* as well as the stop 85*e* made of resin interposed between the end wall 11 of the housing 10 and the vane 50. This further increases durability.

REFERENCE SIGNS LIST

10 housing
11 end wall
12 peripheral wall
13 bearing
20 shaft
21 concavity
30 plug
31 aperture
40 partition
50 vane
51 vane (first pressurizing portion)
52 vane (second pressurizing portion)
71, 72 chamber
81, 86 first groove
82, 87 second groove
83, 88 third groove
84, 85 valve body
84*a*, 85*a* main body
84*b* projection
84*c*, 84*d*, 85*d*, 85*e* stop
85*b* first projection wall
85*c* second projection wall

The invention claimed is:

1. A rotary damper comprising:
    a hollow housing which is opened at its one end and completely closed by an end wall at the other end;
    a bearing formed in the end wall;
    a shaft fitted to the bearing;
    a plug made of metal having an aperture into which the shaft is inserted, and fixed to the housing for closing the opening of the housing;
    a partition arranged inside the housing for rotation in accordance with rotation of the housing;

a viscous liquid filling a chamber defined by the partition; and a vane made of metal and arranged in the chamber for rotation in accordance with the rotation of the shaft, wherein the vane includes a check valve, the check valve includes a valve body, and the valve body includes a stop made of resin and arranged between the plug and the vane and the stop interposed between the plug and the vane is configured to prevent flotation of the shaft to reduce the abrasions of the plug and the vane.

2. The rotary damper according to claim 1, wherein the vane includes a first pressurizing portion pressurizing the viscous liquid when the check valve is opened, and a second pressurizing portion pressurizing the viscous liquid when the check valve is closed, and when the check valve is closed, the stop is located between the plug and the second pressurizing portion, comes into contact with the first pressurizing portion, and is supported by the first pressurizing portion.

3. The rotary damper according to claim 1, wherein the valve body further includes a stop made of resin and arranged between the end wall and the vane.

\* \* \* \* \*